US011259296B2

(12) United States Patent
Wang et al.

(10) Patent No.: US 11,259,296 B2
(45) Date of Patent: *Feb. 22, 2022

(54) SRS DESIGN FOR UNLICENSED CARRIERS

(71) Applicant: Telefonaktiebolaget LM Ericsson (publ), Stockholm (SE)

(72) Inventors: Meng Wang, Sundbyberg (SE); Jung-Fu Cheng, Fremont, CA (US); Fredrik Lindqvist, Järfälla (SE); Amitav Mukherjee, Fremont, CA (US); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,024

(22) Filed: Feb. 28, 2019

(65) Prior Publication Data

US 2019/0200353 A1    Jun. 27, 2019

Related U.S. Application Data

(63) Continuation of application No. 15/706,292, filed on Sep. 15, 2017, now Pat. No. 10,225,836, which is a
(Continued)

(51) Int. Cl.
*H04L 12/28* (2006.01)
*H04W 72/04* (2009.01)
(Continued)

(52) U.S. Cl.
CPC ....... *H04W 72/0446* (2013.01); *H04L 5/0044* (2013.01); *H04L 5/0048* (2013.01);
(Continued)

(58) Field of Classification Search
CPC ............... H04L 5/0048; H04L 25/0224; H04L 25/0226; H04L 5/0044; H04L 5/0057;
(Continued)

(56) References Cited

U.S. PATENT DOCUMENTS 10,588,039 B2 *   3/2020   Kim ..................... H04B 7/0413
2015/0085797 A1   3/2015   Ji et al.
(Continued)

FOREIGN PATENT DOCUMENTS

CN       104488213 A     4/2015
RU       2454001 C2      6/2012
(Continued)

OTHER PUBLICATIONS

Unknown, Author, "Remaining Issues on LAA UL", ZTE, 3GPP TSG RAN WG1 Meeting #81, R1-153437, Fukuoka, Japan, May 25-29, 2015, 1-5.
(Continued)

*Primary Examiner* — John Pezzlo
(74) *Attorney, Agent, or Firm* — Murphy, Bilak & Homiller, PLLC

(57) ABSTRACT

There is disclosed a User Equipment for a MulteFire wireless communication network. The User Equipment comprises processing circuitry and a transmitter, the User Equipment being adapted for utilizing the processing circuitry and the transmitter for performing a Listen-Before-Talk (LBT) procedure for one or more transmission bandwidths; transmitting Physical Uplink Shared CHannel (PUSCH) signaling in a PUSCH subframe on one or more interlaces within the one or more transmission bandwidths; and transmitting Sounding Reference Signaling on the one or more interlaces in the PUSCH subframe.

12 Claims, 11 Drawing Sheets

Related U.S. Application Data continuation of application No. 15/425,201, filed on Feb. 6, 2017, now Pat. No. 9,848,424.

(60) Provisional application No. 62/291,897, filed on Feb. 5, 2016.

(51) Int. Cl.

| | | |
|---|---|---|
| *H04L 5/00* | (2006.01) | |
| *H04L 25/02* | (2006.01) | |
| *H04W 74/08* | (2009.01) | |
| *H04J 1/16* | (2006.01) | |

(52) U.S. Cl.
CPC ........ *H04L 5/0053* (2013.01); *H04L 25/0224* (2013.01); *H04W 74/0808* (2013.01)

(58) Field of Classification Search
CPC ............... H04L 5/0224; H04L 5/0226; H04W 72/0446; H04W 74/0808; H04W 16/14; H04W 74/0816; H04B 7/061; H04B 7/0697
USPC .................................. 370/252, 329, 278, 430
See application file for complete search history.

(56) References Cited

U.S. PATENT DOCUMENTS

| | | | |
|---|---|---|---|
| 2015/0098369 A1 | 4/2015 | Song et al. | |
| 2015/0358826 A1 | 12/2015 | Wei et al. | |
| 2015/0358920 A1* | 12/2015 | Sorrentino | H04W 52/242 455/522 |
| 2016/0278050 A1 | 9/2016 | Nory et al. | |
| 2016/0286545 A1* | 9/2016 | Luo | H04W 74/0808 |
| 2016/0323915 A1* | 11/2016 | Liu | H04W 74/0833 |
| 2017/0027002 A1* | 1/2017 | Yerramalli | H04W 74/004 |
| 2017/0086216 A1* | 3/2017 | Patil | H04W 72/044 |
| 2017/0149484 A1 | 5/2017 | Nimbalker et al. | |
| 2017/0163388 A1 | 6/2017 | Wiemann et al. | |
| 2017/0180085 A1* | 6/2017 | Balasubramanian | H04L 1/1812 |
| 2017/0188323 A1 | 6/2017 | Bhushan et al. | |
| 2017/0223640 A1* | 8/2017 | Dinan | H04W 72/0473 |
| 2017/0223675 A1 | 8/2017 | Dinan et al. | |
| 2018/0323917 A1* | 11/2018 | Um | H04L 5/005 |
| 2020/0296673 A1* | 9/2020 | Ouchi | H04W 52/325 |

FOREIGN PATENT DOCUMENTS

| | | |
|---|---|---|
| WO | 2009152657 A1 | 12/2009 |
| WO | 2014189908 A2 | 11/2014 |
| WO | 2014189912 A1 | 11/2014 |

OTHER PUBLICATIONS

Unknown, Author, "Support of UL transmission for LAA", Huawei, HiSilicon, 3GPP TSG RAN WG1 Meeting #80bis, R1-151302, Belgrade, Serbia, Apr. 20-24, 2015, 1-6.

Unknown, Author, "Uplink Waveform for LAA", Qualcomm Incorporated, 3GPP TSG RAN WG1 #81, R1-152790, Fukuoka, Japan, Apr. 25-29, 2015, 1-4.

Unknown, Author, "Uplink Waveform for LAA", 3GPP TSG RAN WG1 #80bis, R1-151407, Qualcomm Incorporated, Apr. 20-24, 2015, pp. 1-3.

* cited by examiner

SRS DESIGN FOR UNLICENSED CARRIERS

TECHNICAL FIELD

The present disclosure pertains to wireless communication technology, in particular to reference signals like Sounding Reference Signals, which may be used for unlicensed carriers.

BACKGROUND

The ongoing standalone LTE-U forum and future 3GPP Rel-14 work item on Uplink Licensed-Assisted Access (LAA) intends to allow LTE UEs to transmit on the uplink in the unlicensed 5 GHz or license-shared 3.5 GHz radio spectrum. For the case of standalone LTE-U, respectively the MulteFire (MF) project, the initial random access and subsequent UL transmissions take place entirely on the unlicensed spectrum. Regulatory requirements may not permit transmissions in the unlicensed spectrum without prior channel sensing. Since the unlicensed spectrum must be shared with other radios of similar or dissimilar wireless technologies, a so-called listen-before-talk (LBT) method needs to be applied for channel sensing. LBT involves sensing the medium for a pre-defined minimum amount of time and backing off if the channel is busy. Therefore, the initial random access (RA) procedure for standalone LTE-U should involve as few transmissions as possible and also have low latency, such that the number of LBT operations can be minimized and the RA procedure can then be completed as quickly as possible.

Today, the unlicensed 5 GHz spectrum is mainly used by equipment implementing the IEEE 802.11 Wireless Local Area Network (WLAN) standard, also known under its marketing brand as "Wi-Fi."

SUMMARY

It is an object of the present disclosure to provide improved approaches for reference signaling in the context of carriers or frequency ranges accessed utilizing an LBT based approach.

Accordingly, there is disclosed a terminal for a wireless communication network. The terminal is adapted for performing a Listen-Before-Talk (LBT) procedure for one or more transmission bandwidths. Moreover, the terminal is adapted for transmitting Physical Uplink Shared CHannel, PUSCH, signaling in a PUSCH subframe on one or more interlaces within the one or more transmission bandwidths. The terminal is further adapted for transmitting Sounding Reference Signaling (SRS) on the one or more interlaces in the PUSCH subframe. The terminal may comprise corresponding processing and/or control circuitry, and/or radio circuitry, e.g. a transmitter. Alternatively or additionally, the terminal may comprise one or more corresponding modules, e.g. a LBT module and/or a PUSCH module and/or a SRS module.

In particular, there may be considered a User Equipment (UE) for a MulteFire wireless communication network. The User Equipment comprises processing circuitry and a transmitter. The User Equipment is adapted for utilizing the processing circuitry and the transmitter for performing a Listen-Before-Talk, LBT, procedure for one or more transmission bandwidths, as well as for transmitting Physical Uplink Shared CHannel, PUSCH, signaling in a PUSCH subframe on one or more interlaces within the one or more transmission bandwidths, and transmitting Sounding Reference Signaling on the one or more interlaces in the PUSCH subframe.

Moreover, a method of operating a terminal in a wireless communication network is described, the terminal being adapted for performing a LBT procedure for one or more transmission bandwidths. The method comprises transmitting Physical Uplink Shared CHannel, PUSCH, signaling in a PUSCH subframe on one or more interlaces within the one or more transmission bandwidths, and transmitting Sounding Reference Signaling on the one or more interlaces in the PUSCH subframe.

Specifically, a method for operating a user Equipment in a MulteFire wireless communication network may be considered. The method comprises performing a Listen-Before-Talk, LBT, procedure for one or more transmission bandwidths, transmitting Physical Uplink Shared CHannel, PUSCH, signaling in a PUSCH subframe on one or more interlaces within the one or more transmission bandwidths, as well as transmitting Sounding Reference Signaling on the one or more interlaces in the PUSCH subframe.

It may be considered that transmitting PUSCH signaling and/or reference signaling, in particular SRS, is based on the LBT procedure. In particular, corresponding transmission may be performed (in relation to a transmission bandwidth) if the LBT procedure is successful. Generally, transmitting PUSCH signaling and/or reference signaling/SRS may be based on a configuration. It may be considered that transmitting PUSCH signaling and reference signaling/SRS is based on the same LBT procedure. A LBT procedure may generally be performed before the related transmitting, e.g. of PUSCH signaling and/or SRS. Generally, PUSCH signaling and/or reference signaling may be considered uplink signaling. For different transmission bandwidth, different LBT procedure may be performed, e.g. such that each LBT procedure is independent from the other procedures, e.g. in terms of possible results, and/or pertains to a different transmission bandwidth. Different transmission bandwidths may be neighboring transmission bandwidth and/or non-overlapping transmission bandwidths.

Generally, transmitting Sounding Reference Signaling may comprise multiplexing Sounding Reference Signaling transmitted on different antenna ports via frequency division and/or based on cyclic shifts. The antenna ports may be considered to be associated to the transmitting terminal.

It may be considered that transmitting Sounding Reference Signaling comprises transmitting Sounding Reference Signaling at the end (in time domain) of the PUSCH subframe, in particular in the last symbol of the PUSCH subframe. The last symbol may be a SC-FDMA (Single Carrier Frequency Division Multiple Access) symbol, or in some cases an OFDMA (Orthogonal Frequency Division Multiple Access) symbol, e.g. in the context of 5G technology, like 3GPP New Radio (NR). The Sounding Reference Signaling may cover (only) the last or the two last symbols. Alternatively or additionally, the Sounding Reference Signaling may cover, in frequency domain, the same frequencies and/or subcarriers as the PUSCH signaling, and/or a part thereof, e.g. as defined according to the one or more interlaces.

There is also considered a network node for a wireless communication network. The network node is adapted for estimating channel conditions based on Sounding Reference Signaling received from at least one terminal. Receiving Sounding Reference Signaling comprises receiving Physical Uplink Shared CHannel, PUSCH, signaling in a PUSCH subframe on one or more interlaces, and receiving Sounding Reference Signaling on the one or more interlaces in the PUSCH subframe. The network node may comprise corresponding processing or control circuitry, and/or corresponding radio circuitry, e.g. a receiver. Alternatively or additionally, the network node may comprise one or more corresponding modules, e.g. an estimating module and/or a receiving module and/or an SRS receiving module and/or a PUSCH receiving module.

Specifically, there is described an Access Point for a MulteFire wireless communication network, the Access Point comprising processing circuitry and a receiver. The Access Point is adapted for utilizing the processing circuitry and the receiver for estimating channel conditions based on Sounding Reference Signaling received from at least one User Equipment for the MulteFire wireless communication network; wherein receiving Sounding Reference Signaling comprises receiving Physical Uplink Shared CHannel, PUSCH, signaling in a PUSCH subframe on one or more interlaces, and receiving Sounding Reference Signaling on the one or more interlaces in the PUSCH subframe.

A method for operating a network node in a wireless communication network is discussed. The method comprises estimating channel conditions based on Sounding Reference Signaling received from at least one terminal, wherein receiving Sounding Reference Signaling comprises receiving Physical Uplink Shared CHannel, PUSCH, signaling in a PUSCH subframe on one or more interlaces, and receiving Sounding Reference Signaling on the one or more interlaces in the PUSCH subframe.

Moreover, a method for operating an Access Point in a MulteFire wireless communication network is proposed. The method comprises estimating channel conditions based on Sounding Reference Signaling received from at least one User Equipment for the MulteFire wireless communication network. Receiving Sounding Reference Signaling comprises receiving Physical Uplink Shared CHannel, PUSCH, signaling in a PUSCH subframe on one or more interlaces, and receiving Sounding Reference Signaling on the one or more interlaces in the PUSCH subframe.

Receiving of the PUSCH signaling and/or the SRS may be based on a configuration, which may be provided and/or configured by the network node to the transmitting terminal/s. In particular, the receiver and/or network node (respectively, it circuitry) may be configured to receive and/or demodulate and/or decode and/or interpret received signaling according to the described transmitted structure of the signaling.

It may be considered that Sounding Reference Signaling is transmitted at the end (in time domain) of the PUSCH subframe, in particular in the last symbol of the PUSCH subframe. The last symbol may be a SC-FDMA (Single Carrier Frequency Division Multiple Access) symbol, or in some cases an OFDMA (Orthogonal Frequency Division Multiple Access) symbol, e.g. in the context of 5G technology, like 3GPP New Radio (NR). The Sounding Reference Signaling may cover (only) the last or the two last symbols. Alternatively or additionally, the Sounding Reference Signaling may cover, in frequency domain, the same frequencies and/or subcarriers as the PUSCH signaling, and/or a part thereof, e.g. as defined according to the one or more interlaces.

In general, Sounding Reference Signaling transmitted on different antenna ports and/or by different terminals may be multiplexed via frequency division and/or based on cyclic shifts. Such multiplexing may be based on configuration/s, e.g. determined by, and/or configured by, the network node. It may be considered that a network node configuring a terminal with a configuration knows the corresponding configuration. It should be noted that a transmission bandwidth for a receiver is the bandwidth it receives on (but denotes the bandwidth the transmitter transmitted on). Also, for a receiver signaling from different transmitters may be multiplexed, e.g. such that the receiver may determine which signaling stems from which transmitter. A configuration determined and/or provided by the network node or receiver may indicated such multiplexing, for example for each individual terminal and/or for a group of more than one terminal.

There may also be considered a program product comprising code executable by control circuitry (or processing circuitry), the code causing the processing or control circuitry to carry out and/or control any one of the methods as described herein.

A carrier medium carrying and/or storing a program product as described herein is disclosed as well.

The approaches described herein allow transmission of reference signaling in the context (e.g., on the same frequency resources, e.g. subcarriers) as PUSCH signaling, without requiring an additional LBT procedure to be performed. This increases reliability and allows improved use of resources subject to LBT access.

It may be considered that a terminal is implemented as a User Equipment, in particular a User Equipment for MulteFire. The network node may be implemented a base station for MulteFire, which may be referred to as Access Point.

A transmission bandwidth may represent a frequency bandwidth and/or range. A transmission bandwidth may for example be a system bandwidth, and/or a bandwidth of carrier and/or a carrier aggregation, and/or a bandwidth for which a LBT procedure has to be performed for access, e.g. according to regulation. An interlace may generally represent a bandwidth within a transmission bandwidth and/or may be considered to be encompassed inside the bandwidth, and/or to represent a part of the bandwidth. An interlace may comprise a frequency range (e.g., a continuous range, and/or two or more discontinuous ranges) for transmission (e.g., scheduled and/or intended and/or reserved), in particular for one terminal, e.g. for transmission on PUSCH and/or for reference signaling like SRS. In some variants, an interlace may additionally comprise a frequency range (e.g., a continuous range, and/or two or more discontinuous ranges) blocked and/or free from (by the same UE or terminal) transmission (e.g., scheduled and/or intended and/or reserved). This does not exclude that other terminals or devices may utilize blocked and/or free frequency ranges. In general, an interlace may be block-based.

Sounding Reference Signaling may be reference signaling not related to the PUSCH signaling, e.g. not intended and/or used for demodulating and/or decoding such, and/or modulated and/or encoded independently of PUSCH signaling.

It may generally be considered that, alternatively or additionally to transmitting PUSCH signaling, sPUCCH (shortened PUCCH) signaling is transmitted, e.g. in one or more interlaces, and/or in a similar manner as described in relation to PUSCH signaling. For sPUCCH, the Sounding Reference Signaling may cover in time domain one, two, three or four symbols, and/or, in frequency domain, the subcarriers used for transmission of sPUCCH, and/or a part thereof. In some cases, the SRS signaling may replace and/or represent the sPUCCH signaling. The sPUCCH SRS structure may depend on the presence of an LBT gap between sPUCCH and PUSCH, e.g. on whether a LBT procedure has to be performed between the transmissions of sPUCCH signaling and PUSCH signaling.

A PUSCH subframe may be considered a subframe for which PUSCH signaling is scheduled and/or configured and/or intended. A network node may be adapted for configuring such subframe, and/or may configure such subframe, e.g. with UL grant signaling and/or with implicit scheduling.

Estimating a channel or channel conditions may comprise determining a timing and/or pathloss and/or interference associated to the channel and/or the signaling used for estimating.

BRIEF DESCRIPTION OF THE DRAWINGS

The drawings are provided to illustrate concepts and approaches described herein, and are not intended to limit their scope unless specifically stated otherwise.

The drawings comprise.

DETAILED DESCRIPTION

Long Term Evolution (LTE) is discussed in the following. It should be noted that in the context of this description, LTE may be seen as representative for a wireless communication network using LBT to access a carrier or spectrum and/or using reference signaling like SRS, but that the approaches described herein are not necessarily limited to LTE, but rather could be used for other technologies, e.g. Narrowband and/or MulteFire.

Figure 1:
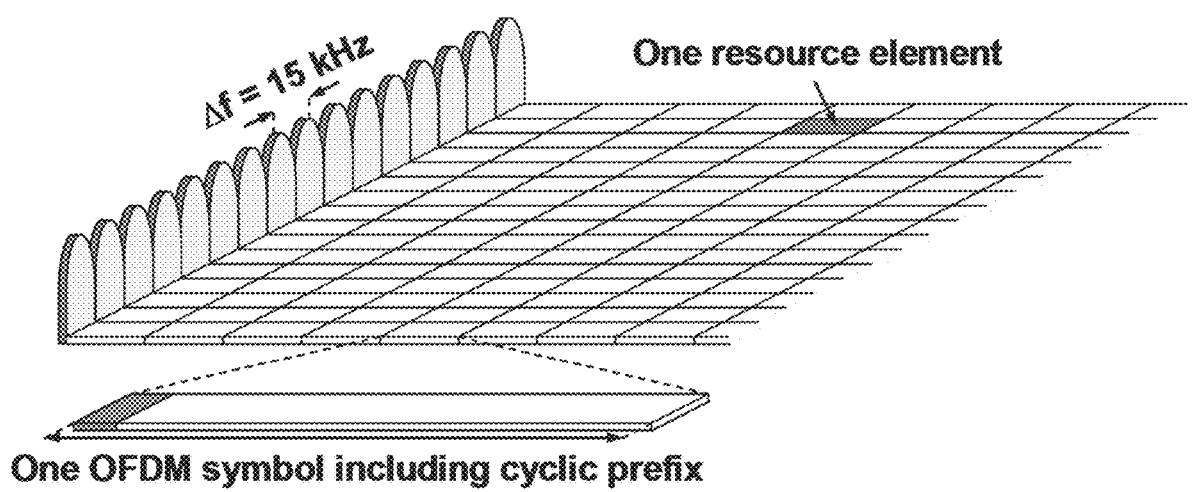
FIG. 1, showing a LTE downlink physical resource.

LTE describes a telecommunication standard which uses OFDM in the downlink and DFT-spread OFDM (also referred to as single-carrier FDMA, SC-FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

FIG. 1 shows a LTE downlink physical resource.

In the time domain, LTE downlink transmissions are organized into radio frames of 10 ms, each radio frame consisting of ten equally-sized subframes of length Tsubframe=1 ms as shown in Figure. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs (including cyclic prefix).

Figure 2:
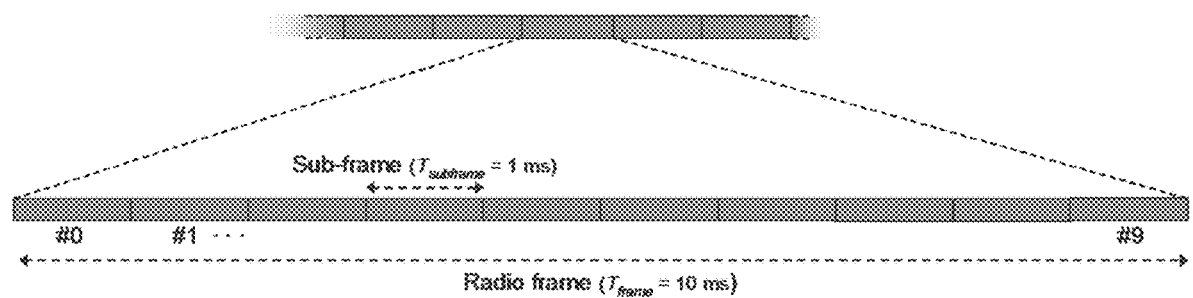
FIG. 2, showing the LTE time-domain structure.

FIG. 2 shows the LTE time-domain structure.

Furthermore, the resource allocation in LTE is typically described in terms of resource blocks (RB), where a RB corresponds to 12 contiguous subcarriers in the frequency domain. Resource blocks are numbered in the frequency domain, starting with 0 from one end of the system bandwidth.

In LTE, uplink transmissions are dynamically scheduled, i.e., in a downlink subframe the base station transmits control information about which terminals should transmit data to the eNB in subsequent subframes, and upon which resource blocks the data is transmitted. The uplink resource grid is comprised of data and uplink control information in the PUSCH, uplink control information in the PUCCH, and various reference signals such as demodulation reference signals (DMRS) and sounding reference signals (SRS). An example uplink subframe is shown in FIG. 3.

It is noted that UL DMRS and SRS are time-multiplexed into the UL subframe, and SRS are always transmitted in the last symbol of a normal UL subframe. DMRS are used for coherent demodulation of PUSCH and PUCCH data. The PUSCH DMRS is transmitted once every slot for subframes with normal cyclic prefix, and is located in the fourth and eleventh SC-FDMA symbols. SRS is not directly associated with other data or control information, but may generally be used (by the receiving network node, e.g. eNodeB) to estimate the uplink channel quality for purposes of frequency-selective scheduling. In order to serve this purpose, it is necessary that SRS from different UEs with different sounding bandwidths can overlap. As illustrated in FIG. 3, interleaved FDMA is used for SRS with a repetition factor of 2, which implies that in the configured SRS bandwidth, the SRS will be mapped to every other subcarrier in a comb-like fashion.

Figure 3:
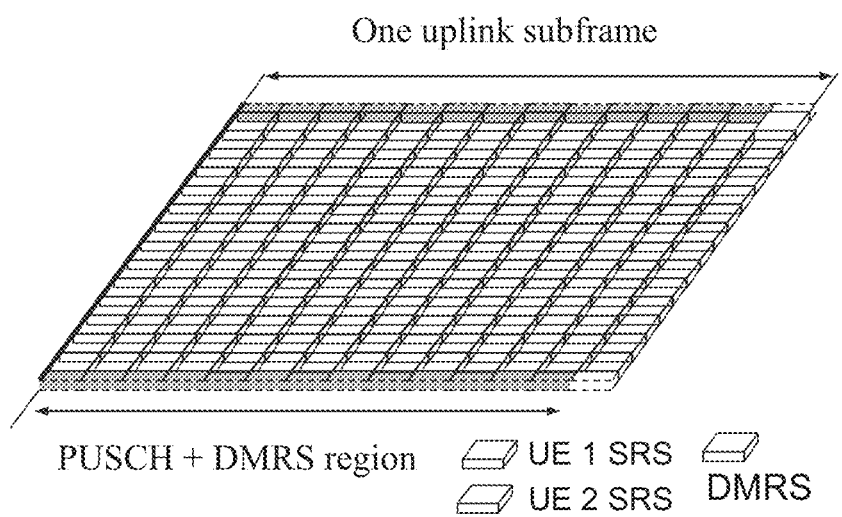
FIG. 3, showing a Rel-12 uplink subframe.

FIG. 3 shows a Rel-12 uplink subframe

Licensed-assisted access (LAA) to unlicensed spectrum using, in this example but not limited to, LTE is discussed in the following.

Up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Figure 4:
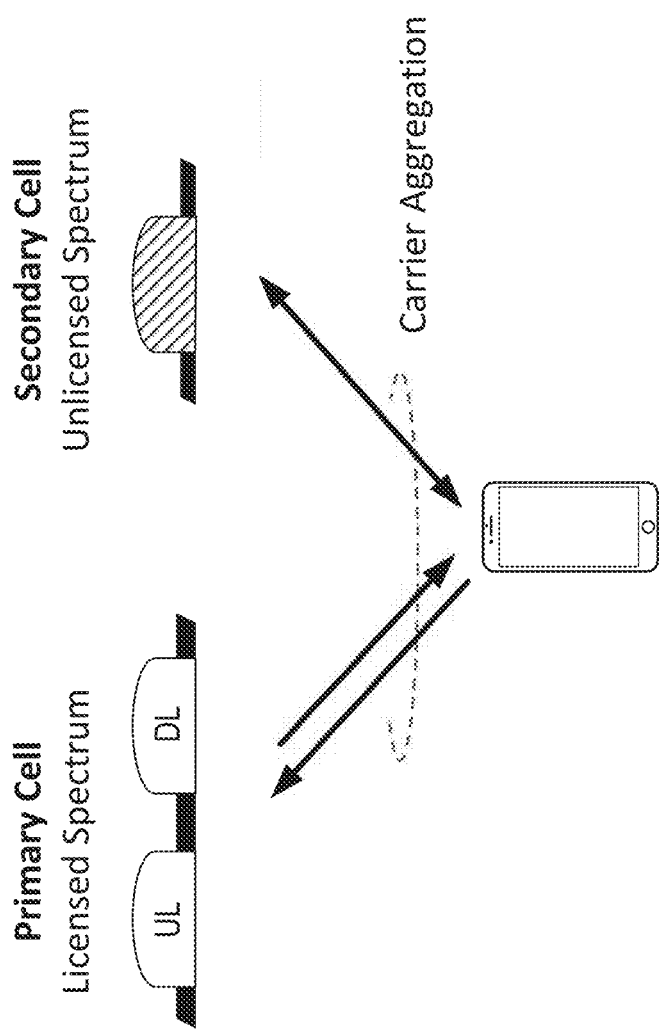
FIG. 4, showing exemplary Licensed-assisted access (LAA) to unlicensed spectrum.

Furthermore, one way to utilize the unlicensed spectrum reliably is to transmit essential control signals and channels on a licensed carrier. That is, as shown in FIG. 4, a UE is connected to a PCell in the licensed band and one or more SCells in the unlicensed band. In this application a secondary cell in unlicensed spectrum is denoted as licensed-assisted access secondary cell (LAA SCell).

FIG. 4 shows Licensed-assisted access (LAA) to unlicensed spectrum using LTE carrier aggregation.

Standalone LTE in Unlicensed Spectrum is discussed in the following.

A new industry forum has been initiated on extending LTE to operate entirely on unlicensed spectrum in a standalone mode, which is referred to as "MulteFire" in marketing terms. There is no licensed carrier for essential control signals transmissions and control channels. Hence, all the transmission needs to be carried on the unlicensed spectrum with no guaranteed channel access availability and also fulfill the regulatory requirements on the unlicensed spectrum.

The use of a carrier in an unlicensed spectrum should be done in a fair and equal manner for different devices. One component when securing this fair sharing is to have requirements on how to distribute transmissions over the system bandwidth. Here, requirements pertaining to at least two different conditions/parameters are commonly found in regulations, namely pertaining to:

1. Occupied channel Bandwidth
2. Maximum Power Spectral Density (PSD)

For example, requirements to both these parameters are enforced for 5 GHz carriers according to ETSI 301 893, while only maximum PSD requirements are enforced in the US regulation for 5 GHz.

The Occupied bandwidth requirement is expressed in the form that the bandwidth containing 99% of the power of the signal shall be between 80% and 100% of the declared Nominal Channel Bandwidth. The current understanding of this requirement is that it is tested (averaged) over a time interval longer than one sub-frame (1 ms). The frequency allocations for one UE must thus vary between sub-frames in such a way that the requirement is fulfilled. It is still an open issue if this requirement needs to be fulfilled for a UE which only transmits in a single sub-frame, such as PRACH or with a single PUSCH.

Maximum PSD requirements exist in many different regions. For most cases, the requirement is stated with a resolution bandwidth of 1 MHz. For example, the ETSI 301 893 specs requires 10 dBm/MHz for 5150-5350 MHz. The implication of the PSD requirement on the physical layer design is that, without proper designs, a signal with small transmission bandwidth will be limited in transmission power. This can negatively affect coverage of the operation. That is, the maximum PSD requirement is a binding condition that requires changes to UL transmissions in unlicensed spectrums.

There may be considered a LBT gap between sPUCCH and a subsequent PUSCH subframe, where sPUCCH is between four to six symbols in length and follows a partial DL subframe. If no gap is present, then what should be sent during sPUCCH by users scheduled only for PUSCH/ePUCCH in the next subframe is a related open issue.

Generally, it should be noted that the terms "unlicensed" or "unlicensed carrier" or "unlicensed spectrum" or "unlicensed bandwidth" may refer to carrier/spectrum accessed using an LBT procedure, and the terms "LBT-accessed", "LBT-accessed carrier" or "LBT-accessed spectrum." "LBT-accessed bandwidth" may be exchanged for these terms anywhere in this disclosure unless specifically stated otherwise. LBT-accessed in this context may refer to the bandwidth/carrier/frequency/spectrum only be accessible and/or only be accessed (e.g., according to regulations and/or a standard) for transmission after a successful LBT procedure has been performed, wherein a successful LBT procedure may allow access for transmission (i.e., allow transmission) for a given amount of time, which e.g. may be defined by regulations or a standard. The amount of time may in particular cover the duration of one or more subframes (1 subframe for LTE has a duration of 1 ms).

Interlacing Design for UL transmission is discussed in the following.

Interlacing transmissions may be considered as a means to give LAA (or generally, UL signals on carriers/spectrum using LBT/channels sensing) UL signals with small BW higher transmission powers when needed (and, to a lesser extent, to satisfy the transmission BW requirement). The interlacing transmissions can be done on a PRB (Physical Resource Block) basis. Interlacing on a sub-carrier basis may produce transmissions suffering from ICI (Inter Carrier Interference) in scenarios with large frequency offsets or with a delay spread larger than the cyclic prefix. This design is also referred to as Block-Interleaved FDMA (B-IFDMA).

Figure 5:
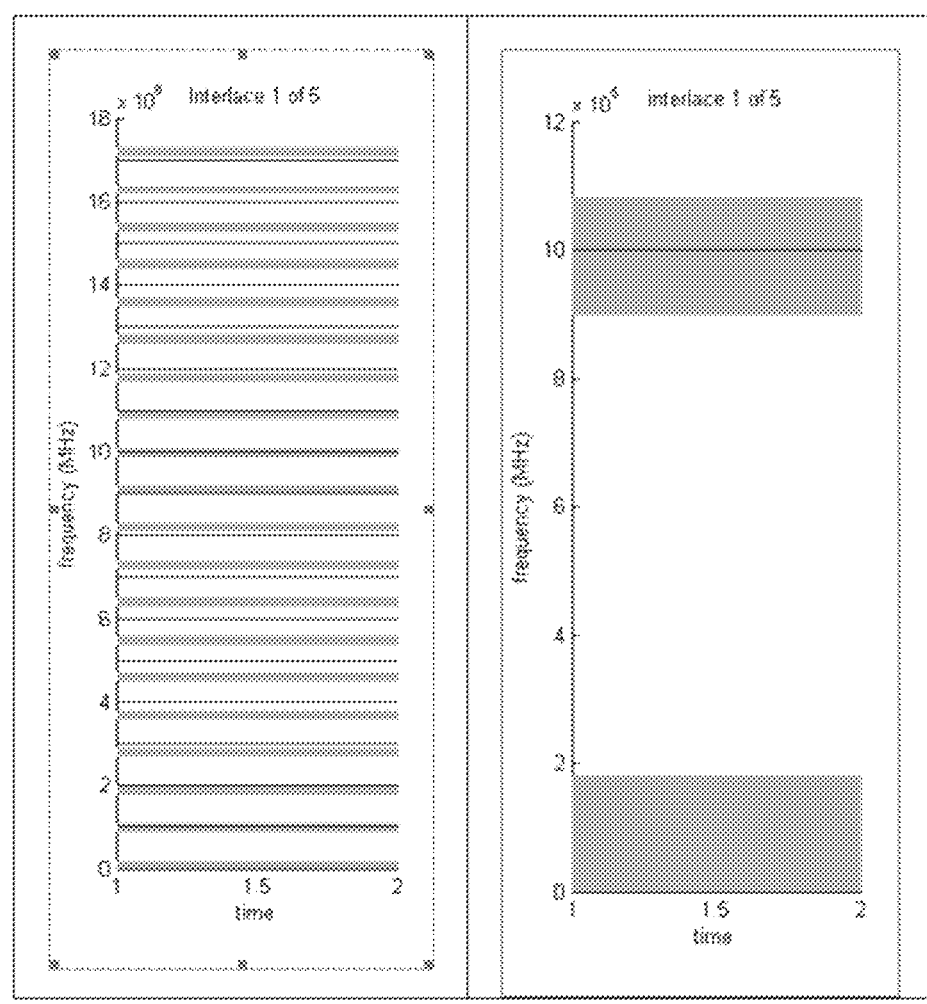
FIG. 5, showing an allocation of one first interlace.

One interlace is illustrated in FIG. 5, in a design with 5 interlaces for an example of 20 MHz system bandwidth with a maximum of 100 RBs available for transmission. As shown in the figure, a uniform spread of the RBs may be considered, i.e., uniform interlaces where each interlace contains 100/5=20 RBs. The figure to the right shows the first 1.2 MHz of the same allocation. The darker lines represent example boundaries of the PSD requirement measurement intervals (1 MHz resolution bandwidth). The light stripes represent the allocated RBs for the interlace.

FIG. 5 shows an allocation of one first interlace, in a design with 5 uniform interlaces for an example of 20 MHz bandwidth (i.e., 100/5=20 RB per interlace). The figure to the right shows the first 1.2 MHz of the same allocation. The darker lines represent the boundaries of the PSD requirement measurement intervals (1 MHz resolution bandwidth). The light stripes represent the allocated RBs for the interlace.

In LAA/standalone LTE-U uplink, the SRS originally designed for LTE on licensed spectrum cannot be reused.

1. On unlicensed carriers, channel access (for transmission) operates based on the LBT mechanism. Channel access availability for SRSs to be transmitted on unlicensed carriers is not guaranteed.

2. In licensed LTE, the SRSs are partly used for channel sounding to allow for frequency-selective scheduling in the UL. For this purpose, the SRS is designed to span across the full bandwidth. In the unlicensed band with interlaced UL resource allocation, not much gain can be provided by frequency-selective scheduling because the PUSCH transmission from different UEs may be evenly distributed across the spectrum. So, the SRS design for unlicensed carries mainly serves to fulfill demands such as UL MIMO sounding and uplink timing estimation.

The present disclosure physical-layer design of SRS for LBT-accessed uplink transmissions, in particular for a LAA/stand-alone LTE-U uplink, including several design options and examples. In the proposed design, the SRSs may be transmitted together with PUSCH signaling, e.g. in order to avoid extra LBT. The SRS may occupy the last (SC-FDMA) symbol in an UL subframe, for example with PUSCH interlaced on RB basis spanning the full transmission bandwidth. In each interlace, the SRSs may be transmitted from different users/antenna ports multiplexed via frequency division and/or cyclic shifts.

The approaches described herein provide at least one of:
1. SRS transmission on unlicensed carriers is enabled without extra LBT.
2. Similar functionalities can be maintained as the SRSs in licensed LTE.
3. Both aspects of SRS measurements and multiple subframe grants can benefit from placing SRS in the last symbol of a subframe.

The approaches are illustrated in more detail by a number of exemplary embodiments. It should be noted that proposed methods can be applied to different variations of wireless communication systems, e.g. LTE, operating in unlicensed spectrum, such as LAA and standalone LTE-U UL.

The following design options describe different examples of reference signal patterns in the context of LTE and using SRS. However, such pattern may be used for other (UL/SL) reference signaling on LBT-accessed bandwidths, e.g. in MulteFire systems, in which the eNodeB's functionality could be provided by an Access Point.

An exemplary SRS design option 1 is described in the following.

In order to avoid extra LBT, the SRS is only transmitted together with PUSCH in the same subframe, where the PUSCH may span the whole bandwidth (e.g., a carrier, and/or a bandwidth allowed and/or prescribed by regulations or a standard) by interlacing.

Figure 6:
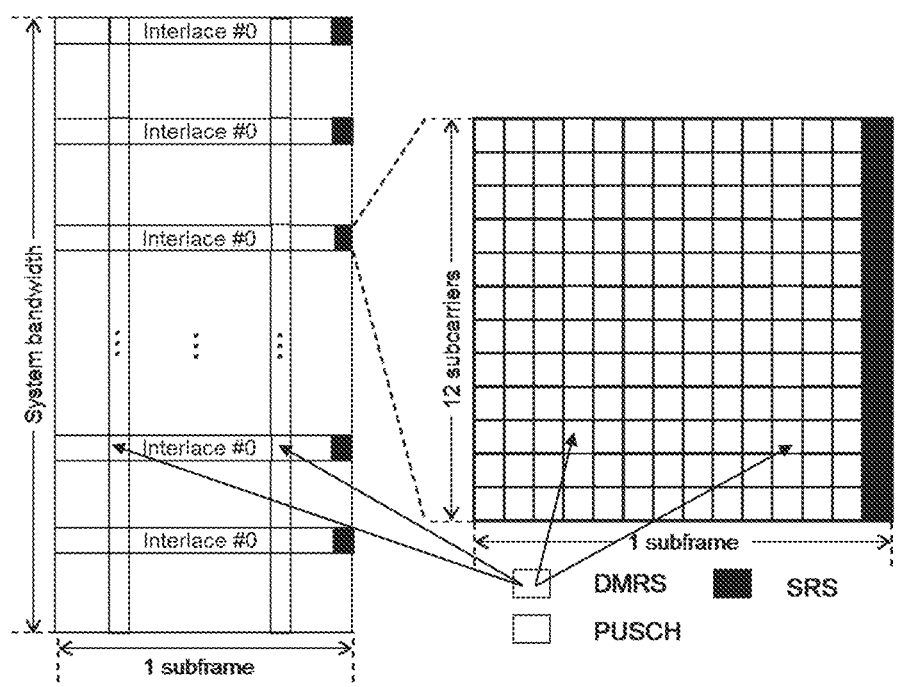
FIG. 6, showing an example of SRS design.

As illustrated in FIG. 6, within one interlace, e.g. interlace #0, the SRS occupies the last (SC-FDMA) symbol. In frequency domain, the SRS spans the whole bandwidth, e.g. by interlacing. Multiplexing the SRSs transmitted from multiple antenna ports per UE and/or multiples users can be based, in particular be solely based, on cyclic shifts.

FIG. 6 shows an example of SRS design option 1.

An exemplary SRS design option 2 is described in the following.

In another option, within each subframe of one interlace, in addition to cyclic shifts, SRSs can be multiplexed in frequency domain i.e. in a comb-like fashion (transmitted on every other subcarrier). An example is illustrated in FIG. 7, where SRS on even antenna ports are transmitted on even subcarriers while SRS for odd antenna ports are transmitted on odd subcarriers (2-comb), or in the opposite way.

Figure 7:
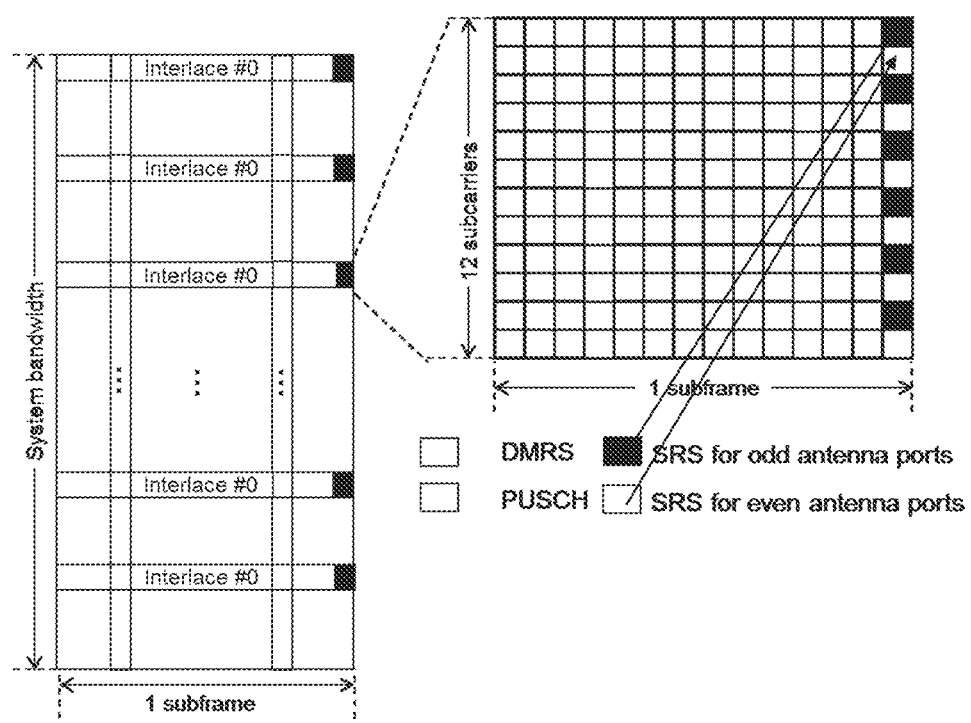
FIG. 7, showing an example of SRS design.

FIG. 7 shows an example of SRS design option 2

An exemplary SRS design option 3 is described in the following.

In this option, which may be in addition to and/or based on option 2, multiplexing by frequency division and cyclic shifts in each subframe of one interlace is highly flexible and configurable. For example, the comb use, i.e. the subcarrier mapping per user or antenna port can be configurable. The configuration information can be indicated by the eNodeB or Access Point in the UL grant and/or higher layer signaling. In another example, the comb use factor may not be limited to 2 (occupying every other subcarrier). A higher comb use factor, for example, 4-comb may be used for multiplexing more users.

Generally, multiplexing multiple users and/or antenna ports can be carried out by various combinations of frequency division and cyclic shifts. For example, to multiplex 4 antenna ports within one interlace, 4 combs without cyclic shifts and 2 combs with two different cyclic shifts for antenna ⅓ and ⅔ respectively are two typical options.

An exemplary SRS design option 4 is described in the following.

In this option, SRS transmission per user/terminal involves two interlaces and 2-comb is used in each interlace. As exemplified in FIG. 8, SRS is transmitted on the even subcarriers in the assigned interlace x (interlace #0 in the figure) and on the odd subcarriers in the interlace mod(x+5, 10) (interlace #5 in the figure).

Another example, alternatively, is that SRS is transmitted on the even subcarriers of interlaces x and mod(x+5, 10) if x<5 while on the odd subcarriers if x>=5.

Note that, if a UE is assigned half of the interlaces, its SRS will cover every PRB in the system BW. When two UEs are assigned half of the interlaces each, their SRS signals are multiplexed across all the subcarriers in the channel BW.

The above design option can be extended to a more general one. SRS transmission per user/terminal may involve m(>=2) interlaces and a n(>=2)-comb is used in each interlace. In one example, the multiplexing occurs in frequency domain only, i.e. SRS per user/antenna port is transmitted on a specific set of interlaces and on a specific comb in each such interlace. The configuration for such SRS transmission is flexible. In another example, in addition to the last example, cyclic shifts can be used to further enhance the multiplexing capacity.

Figure 8:
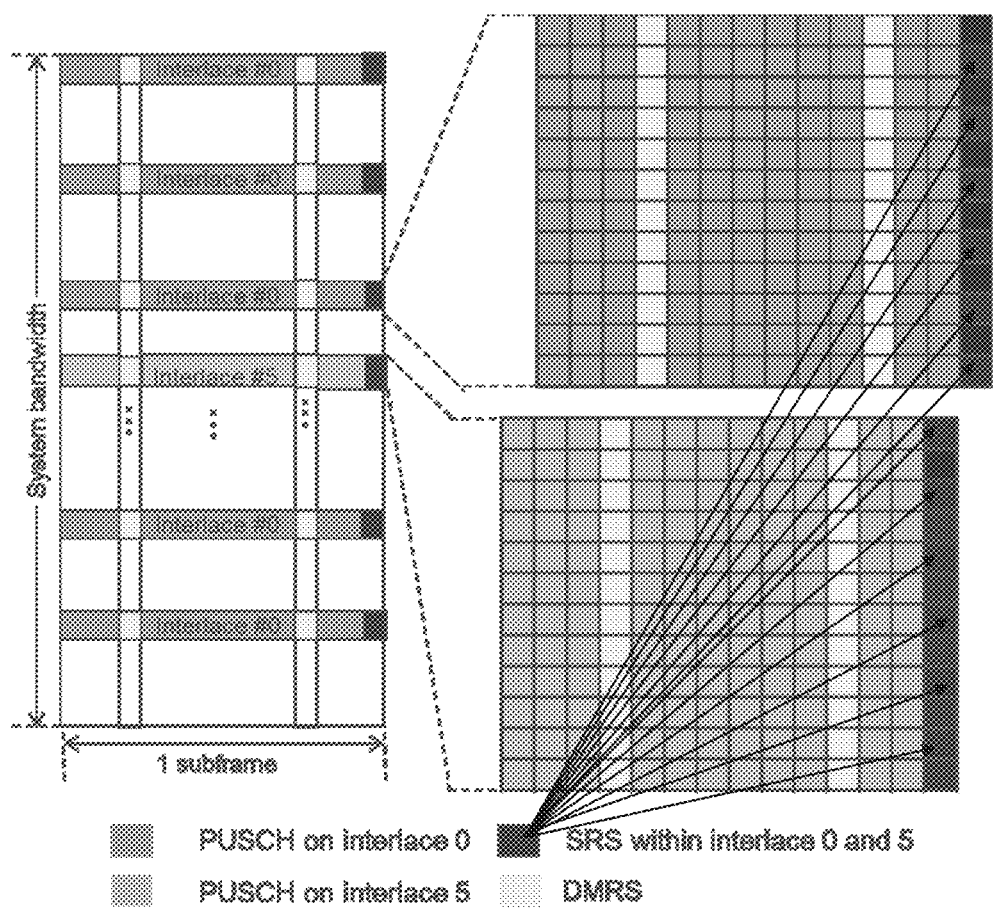
FIG. 8, showing an example of SRS design.

FIG. 8 shows an example of SRS design option 4.

An exemplary SRS design option 5 is described in the following.

This option addresses what should be sent by users that do not have ACK/NACK or CSI transmission in the MulteFire sPUCCH, and are scheduled for PUSCH or ePUCCH transmission immediately after sPUCCH. As an example, users sending feedback in sPUCCH and users scheduled in UL subframes after the sPUCCH may both perform UL LBT prior to the start of the sPUCCH, and no additional LBT gap is present between sPUCCH and the next UL subframe. In this case, SRS is used as an initial signal by the users/terminals that do not transmit feedback during sPUCCH. This SRS can be used at the eNB for timing and frequency estimation, in addition to MIMO sounding.

Figure 9:
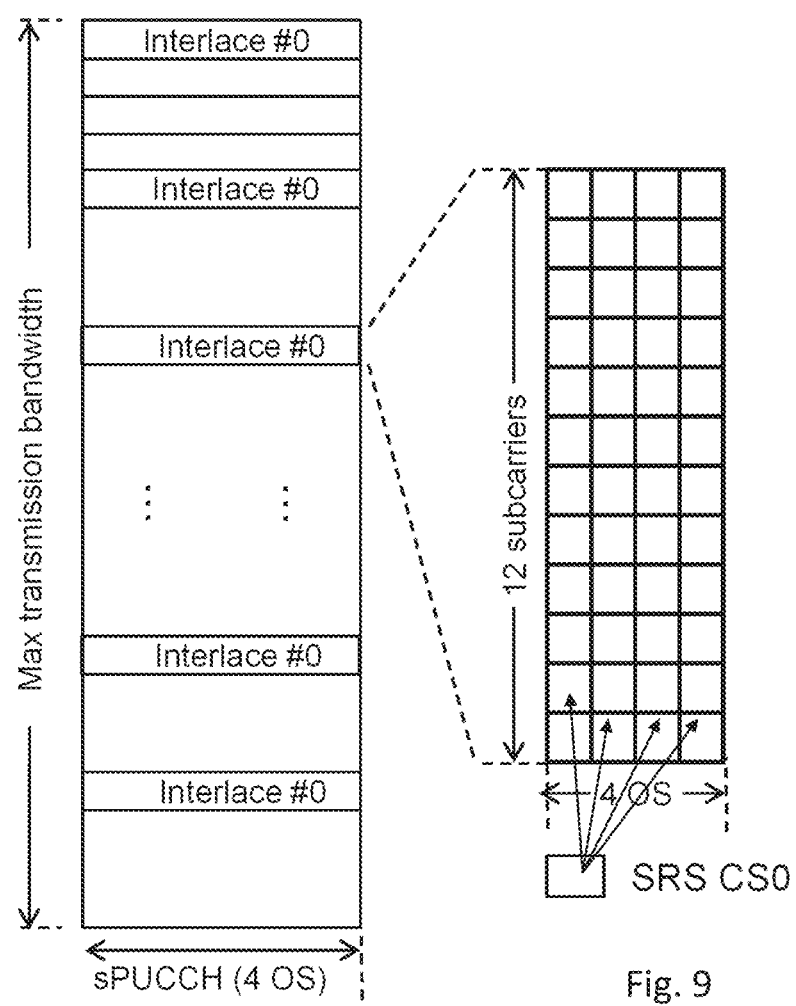
FIG. 9, showing exemplary SRS in sPUCCH.

FIG. 9 shows SRS in sPUCCH.

A non-limiting example is shown in FIG. 9, where a SRS signal is repeated across the sPUCCH region in time on a pre-specified interlace, with the same cyclic shift in all four symbols. All users that do not send feedback in the sPUCCH may be assigned the same interlace for their SRS-based initial signal. In another case, different cyclic shifts or combs may be configured in each symbol for a particular user. In other examples, the frequency domain allocation of the SRS may be based on one or more of the previously described SRS design options.

Figure 10:
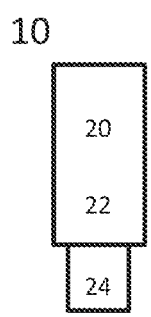
FIG. 10, schematically showing a terminal.

FIG. 10 schematically shows a terminal 10, which may be implemented in this example as a User Equipment. Terminal 10 comprises control circuitry 20, which may comprise a controller connected to a memory. A receiving module and/or transmitting module and/or control or processing module and/or CSI receiving module and/or scheduling module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry.

Figure 11:
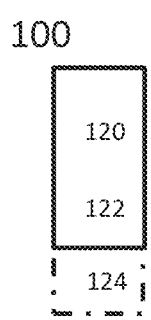
FIG. 11, schematically showing a network node.

FIG. 11 schematically show a network node or base station 100, which in particular may be an eNodeB or an MulteFire Access Point. Network node 100 comprises control circuitry 120, which may comprise a controller connected to a memory. A receiving module and/or transmitting module and/or control or processing module and/or scheduling module and/or CSI receiving module, may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry.

This disclosure describes several options of SRS design for SRS transmission on unlicensed carriers. The SRS may occupy the last multicarrier symbol (i.e., last OFDM/B-IFDMA symbol), e.g. in each UL subframe or subcarrier of the interlace(s). The proposed design options describe the various mechanisms through which SRSs transmitted from different users/antenna ports can be multiplexed.

Generally, there may be considered a terminal for a wireless communication network. The terminal may be adapted for, and/or comprise an LBT module for, performing a LBT-procedure and/or LBT access for one or more (transmission) bandwidths. The terminal may be adapted and/or configured for, and/or comprise a transmit module for transmitting reference signaling via the bandwidth, in particular based on a (successful) LBT procedure and/or LBT access performed pertaining to the bandwidth. Transmitting may be based on a configuration. The terminal may be adapted to be configured, and/or comprise a configuration module for being configured accordingly.

There may be considered a method for operating a terminal for and/or in a wireless communication network. The method may comprise performing a LBT-procedure and/or LBT access for one or more (transmission) bandwidths. Generally, the method may comprise transmitting reference signaling via the (transmission bandwidth), in particular based on a (successful) LBT procedure and/or LBT access performed pertaining to the bandwidth. Transmitting may be based on a configuration. The method may comprise receiving a corresponding configuration, e.g. from a network node.

There may be considered a network node for a wireless communication network. The network node may be adapted for, and/or comprise a configuring module for, configuring a terminal with a configuration for transmitting reference signaling, in particular the configuration may pertain to reference signaling on a (transmission) bandwidth accessed and/or accessible (for the terminal) based on a (successful) LBT procedure or access performed by the terminal. The network node may be adapted for, and/or comprise a receiving module for, receiving reference signaling based on the configuration. Alternatively or additionally, the network node may be adapted for, and/or comprise an estimating module for, estimating channel conditions based on the received reference signaling.

Moreover, there may be considered a method for operating a network node for and/or in a wireless communication network. The method may comprise configuring a terminal with a configuration for transmitting reference signaling, in particular the configuration may pertain to reference signaling on a (transmission) bandwidth accessed and/or accessible (for the terminal) based on a (successful) LBT procedure or access performed by the terminal. The method may comprise receiving reference signaling based on the configuration. Alternatively or additionally, the method may comprise estimating channel conditions based on the received reference signaling.

Reference signaling may generally comprise one or more reference signals, in particular SRS. A reference signal may generally be considered to cover and/or occur in and/or be defined pertaining to (only) one resource element. A plurality of reference signals may cover and/occur in more than one resource elements, which may be arranged in a (reference signal) pattern in one or more interlaces and/or a transmission bandwidth.

Transmitting reference signaling may be part of and/or comprise interlacing the bandwidth and/or using one or more interlaces covering and/or included in the bandwidth. Alternatively or additionally, transmitting reference signaling may be performed based on a (reference signal) pattern. Transmitting reference signaling may be on a sidelink and/or uplink.

A pattern, in particular a reference signal pattern and/or an interlace pattern, may be configurable and/or be based on a configuration. The configuration may be configured by a network node like an eNodeB, which may in particular the node which is the intended receiver of the reference signaling. A reference signal pattern may in particular be a comb pattern, and/or one of the patterns described herein in particular regarding designs 1 to 5.

For different interlaces there may be different reference signaling patterns, e.g. based on corresponding configuration.

The reference signals of a pattern may generally be associated to the last symbol of a time structure like a subframe used for (UL) transmission, e.g., if a reference signal is transmitted or to be transmitted in a subcarrier/resource element. A signal being associated to a time unit, e.g. a symbol, may refer to the signal being transmitted at the time or time interval associated to and/or being defined for the time unit or symbol.

A comb may be considered to be pattern may defining an arrangement (in particular regarding frequency) in which between (each) two subcarriers/resource elements on which a reference signal is transmitted/to be transmitted there is at least one subcarrier/resource element (in frequency domain) which is used for transmission of other signaling, e.g. for channel transmission, in particular transmission on PUCCH (Physical Uplink Control CHannel), sPUCCH (shortened PUCCH, for shortened Transmission Time Intervals), ePUCCH (enhanced PUCCH), PUSCH, etc. Alternatively, a comb may define an arrangement in which between each two subcarriers/resource elements on which a reference signal associated to a (first) antenna element or antenna port or antenna subarray or virtual antenna is transmitted/to be transmitted there is at least one subcarrier/resource element (in frequency domain) which is used for transmitting reference signaling associated to at least one other (second) antenna element or antenna port or antenna subarray or virtual antenna transmission.

Generally, a comb may define a pattern in which between two neighboring (having the closest distance to each other in terms of frequency) subcarriers/REs used for reference signaling there are arranged one or more other subcarriers/REs used for other signaling, wherein other signaling may comprise signaling on specific channels and/or reference signaling utilizing a different/other antenna sub-arrangement.

For a n-comb, there may be n−1 other subcarriers/resource elements between two subcarriers and/or resource elements used for transmitting and/or allocated for reference signaling (associated to a (first) antenna element/port/subarray or virtual antenna). Other subcarriers/resource elements may refer to subcarriers/resource elements associated to different kinds of signaling and/or a different antenna sub-arrangement and/or different antenna port. An antenna sub-arrangement may refer to a sub-division of an antenna arrangement or antenna array, wherein a sub-arrangement may comprise a (physical) antenna element, a subarray 8 which may have one or more physical antenna elements) and/or virtual antenna (which may be associated to one or more physical antenna elements), and/or may pertain to an associated antenna port. An antenna port may generally be an interface for providing a signal to an antenna sub-arrangement for transmission using the (physical) antenna elements of the antenna sub-arrangement. It may be considered that an antenna port provides a mapping of signaling, in particular reference signaling, to the antenna element/s.

A pattern may be scheduled, e.g. according to a configuration. Scheduling and/or allocating a pattern may comprise and/or correspond to configuring the terminal with the pattern. A pattern may generally refer to resources used for uplink and/or sidelink transmissions. Different patterns may be configured for different interlaces of a transmission bandwidth. A bandwidth may comprise and/or be covered by a plurality of interlaces.

Performing an LBT procedure and/or LBT access pertaining to a bandwidth may refer to performing the LBT procedure or access to access the bandwidth for transmission.

Reference signaling may comprise one or more reference signals, in particular SRS.

A configuration may generally indicate and/or prescribed a pattern, e.g. a reference signal pattern and/or an interlace pattern, and/or schedule and/or allocate (uplink and/or sidelink) resources accordingly. It is noted that, when using LBT-procedures, allocating a resource for transmission and/or corresponding configuration alone does not allow or necessitate that the resource may be used for transmission.

There may be considered a network node adapted for performing any one of the methods for operating a network node described herein.

There may be considered a terminal adapted for performing any one of the methods for operating a terminal described herein.

A wireless transmitter may be a terminal or a network node.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A (transmission) bandwidth may refer to a frequency range or band or spectrum, which may be accessible for transmission based on LBT, in particular based on a successful LBT-process. The bandwidth may cover a continuous range of frequencies, from a lower border frequency to an upper border frequency. The width (in frequency) of, and/or the (range of) frequencies covered by, the bandwidth or band or spectrum may be defined and/or be based on regulations and/or standards. The bandwidth in particular may cover a plurality of subcarriers and/or resource blocks (respectively carriers) in frequency. It may be considered that the bandwidth is assigned to a time/frequency structure, which may be according to a standard like LTE. The bandwidth may be assigned to a time structure like that of a subframe structure and/or be divided for example into subcarriers and/or frequency units associated with resource blocks and/or resource elements. The (maximum) duration for transmission and/or the bandwidth available for transmission after a successful LBT-access may be defined by regulation and/or a standard. The actual duration of transmission may be dependent on the amount of data to be transmitted. Between two transmission events, there may be required the performance of a successful LBT-process and/or a backoff-period or non-transmission gap.

A bandwidth may be interlaced, such that only parts of the bandwidth are used for transmission (if allowed according to LBT). A part of the bandwidth used for transmission may be assigned to a specific channel, in particular a physical channel like e.g. the PUSCH or PUCCH. Different parts of the bandwidth (and/or different bandwidths) may be assigned to different (physical) channels. The channels may be according to a standard definition, in particular according to LTE. A bandwidth may be covered by a (bandwidth) pattern. The pattern may described/prescribe how parts of a bandwidth (e.g. subcarriers) used for transmission are used, e.g. which parts of the bandwidth used for transmission are assigned to specific signals (e.g., reference signals like SRS) and/or for other signaling, e.g. according to a channel. The pattern may be based on a configuration, which may be configured by a network, in particular a network node like an eNodeB. A pattern pertaining to reference signals (SRS), and/or describing the location of reference signals (SRS) in a bandwidth may be referred to as reference signal pattern. Different parts of a bandwidth may be allocated to different antenna elements/antenna ports/antennas (e.g., virtual antennas) for transmission, e.g. in a MIMO system. Accordingly, resources in a bandwidth may be associated to different antenna elements and/or to different antenna subarrays. A (reference signal) pattern may be superimposed on an interlace pattern.

A terminal and/or network node may comprise and/or be connected or connectable (e.g., for transmission) to an antenna array, which may comprise one or more (physical) antenna elements. (Physical) antenna elements may be arranged (and/or be configured or configurable) in different subarrays and/or virtual antenna elements.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header.

Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry, which may generally be referred to as processing circuitry, of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry or processing circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wi-Fi and/or WIMAX and/or cdma2000 and/or GERAN and/or UTRAN and/or in particular E-Utran and/or LTE and/or NR. A communication may in particular comprise a physical layer (PHY) transmission and/or reception, onto which logical channels and/or logical transmission and/or receptions may be imprinted or layered.

A wireless transmitter may be (or be comprised in) a node of a wireless communication network and/or may be implemented as a terminal and/or User Equipment and/or network node and/or base station and/or relay node and/or any device generally adapted for communication in a wireless communication network, in particular cellular communication.

A cellular network may comprise a network node, in particular a radio network node, which may be connected or connectable to a core network, e.g. a core network with an evolved network core, e.g. according to LTE or NR. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilizes the radio resources, in particular carriers and/or frequencies, and/or equipment (e.g. circuitry like radio circuitry and/or antenna circuitry, in particular transmitter and/or receiver and/or transceiver) provided and/or used for cellular operation. It may be considered that a network node is implemented as an access point, in particular a MulteFire Access Point (MF Access Point).

A terminal may be implemented as a User Equipment. A terminal or a User Equipment (UE) may generally be a device configured for wireless device-to-device communication and/or a terminal for a wireless and/or cellular network, in particular a mobile terminal, for example a mobile phone, smart phone, tablet, PDA, etc. A User Equipment or terminal may be a node of or for a wireless communication network as described herein, e.g. if it takes over some control and/or relay functionality for another terminal or node. It may be envisioned that terminal or a User Equipment is adapted for one or more RATs, in particular LTE/E-UTRA or NR. A terminal or User Equipment may generally be proximity services (ProSe) enabled, which may mean it is D2D capable or enabled. It may be considered that a terminal or User Equipment comprises radio circuitry and/or control circuitry for wireless communication. Radio circuitry may comprise for example a receiver or receiver device and/or transmitter or transmitter device and/or transceiver or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or User Equipment is configured to be a terminal or User Equipment adapted for LTE/E-UTRAN.

A network node or base station may be any kind of base station of a wireless and/or cellular network adapted to serve one or more terminals or User Equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA or NR. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more User Equipments and/or to relay and/or transport communications and/or data between one or more User Equipments and a core network and/or another base station and/or be Proximity Service enabled. An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two User Equipments.

It may be considered that for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands. A network node, e.g. a base station or eNodeB, may be adapted to provide and/or define and/or control one or more cells, e.g. a PCell and/or a LA cell.

A network node, in particular a base station, and/or a terminal, in particular a UE, may be adapted for communication in spectral bands (frequency bands) licensed and/or defined for LTE. In addition, a network node, in particular a base station, and/or a terminal, in particular a UE, may be adapted for communication in freely available and/or unlicensed/LTE-unlicensed spectral bands (frequency bands), e.g. around 5 GHz.

An LBT carrier may refer to a carrier or cell on which an LBT procedure is to be performed before transmitting, in particular in an unlicensed spectrum or frequency band. The expression LBT carrier may be used interchangeably with LA SCell or unlicensed cell or unlicensed carrier. A carrier may be associated to a spectrum and/or frequency band and/or a channel. A cell may have associated to it at least one channel or carrier; it may be considered that a cell comprises different carriers or channels for uplink or downlink. A cell may comprise one or more than one frequency bands (e.g. subcarriers) and/or channels for each data transmission direction (uplink and downlink). There may be different number of channels or frequency bands for uplink and downlink.

A LBT procedure may generally refer to a procedure determining whether a transmission is possible or admissible (in particular, for the node or terminal performing the LBT) to transmit in a given spectrum or frequency band or cell or carrier, in particular on a LA SCell or LBT carrier, and/or whether another transmission is taking place, which would indicate that no own transmission is possible.

A LBT procedure may comprise listening to a channel and/or spectrum and/or frequency band and/or carrier, on which it may be performed which may be intended for a transmission), in particular listening for transmission from another source and/or transmitter, which may comprise receiving and/or detecting the energy or power of transmissions or radiation in this channel and/or spectrum and/or frequency band. Failure of a LBT procedure may indicate that transmissions on the channel or cell or frequency band have been detected, so that it may be considered blocked by or for another transmitter, e.g. due to detection of a predetermined energy or power level. Failure of a LBT procedure may be considered to be equivalent to a determination of a channel/spectrum/band/carrier to be Busy.

A successful LBT procedure may indicate the channel/spectrum/band/carrier to be Idle. Generally, a LBT procedure may be performed before transmission and/or before a scheduled transmission. It may be considered that a LBT procedure is performed frame- and/or subframe-based and/or in synchronization to the timing structure of a cell, in particular a PCell. A LBT procedure may comprise one or more CCA procedures.

Listening and/or performing a CCA may comprise determining and/or measuring the power and/or energy on the channel/spectrum/band/carrier listened to (and/or on which CCA is performed) over predetermined time. The measured power or energy may be compared to a threshold to determine Busy or Idle states.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or network node, may be adapted to determine and/or transmit corresponding allocation data indicating release or de-allocation of resources to one or more wireless devices, in particular to a first wireless device.

Allocation data may be considered to be data scheduling and/or indicating and/or granting resources allocated by the controlling or allocation node, in particular data identifying or indicating which resources are reserved or allocated for communication for a wireless device or terminal and/or which resources a wireless device or terminal may use for communication and/or data indicating a resource grant or release, in particular pertaining to uplink and/or downlink resources. A grant or resource or scheduling grant or scheduling data (which, in particular, may pertain to information regarding and/or representing and/or indicating scheduling of resources) may be considered to be one example of allocation data. Allocation data may in particular comprise information and/or instruction regarding a configuration and/or for configuring a terminal, e.g. indicating a measurement configuration to be used. It may be considered that an allocation node or network node is adapted to transmit allocation data directly to a node or wireless device and/or indirectly, e.g. via a relay node and/or another node or base station.

Allocation data may comprise control data and/or be part of or form a message, in particular according to a predefined format, for example a DCI format, which may be defined in a standard, e.g. LTE. Allocation data may comprise configuration data, which may comprise instruction to configure and/or set a User Equipment for a specific operation mode, in particular a measurement mode, e.g. in regard to the use of receiver and/or transmitter and/or transceiver and/or use of transmission (e.g. TM) and/or reception mode, and/or may comprise scheduling data, e.g. granting resources and/or indicating resources to be used for transmission and/or reception. A scheduling assignment may be considered to represent scheduling data and/or be seen as an example of allocation data. A scheduling assignment may in particular refer to and/or indicate resources to be used for communication or operation. Configuration or allocation data may comprise an indication for configuring a terminal for interlacing, in particular resources available, for which interlacing may be performed, e.g. a set of interlaces and/or how to interlace and/or a mapping for interlacing and/or a frequency range on which to perform interlacing, wherein the frequency range may correspond to the frequency range covered by a set of interlaces.

Configuring a terminal or wireless device or node may comprise instructing and/or causing the terminal or wireless device or node to change its configuration, e.g. at least one setting and/or register entry and/or operational mode. A terminal or wireless device or node may be adapted to configure itself, e.g. according to information or data in a memory of the terminal or wireless device. Configuring a node or terminal or wireless device by another device or node or a network may refer to and/or comprise transmitting information and/or data and/or instructions to the wireless device or node by the other device or node or the network, e.g. allocation data or configuration data and/or scheduling data and/or scheduling grants. Configuring a terminal may include sending allocation data to the terminal indication which modulation and/or encoding to use. A terminal may be configured with and/or for scheduling data and/or to use, e.g. for transmission, scheduled and/or allocated uplink resources, and/or, e.g. for reception, scheduled and/or allocated downlink resources. Uplink resources and/or downlink resources may be scheduled and/or provided with allocation or configuration data.

A first cell may generally be a cell of a licensed cellular network, e.g. LTE. It may be a PCell and/or a cell intended to carry control and command information, in particular for the PCell and/or the second cell, for example a LA SCell.

A second cell and/or second uplink carrier, respectively second downlink carrier, generally may be a cell and/or uplink carrier, respectively downlink carrier, of a non-licensed network and/or a cell and/or uplink carrier, respectively downlink carrier, on which a LBT procedure has to be performed/has been performed before transmission of data, in particular a LA SCell. Control information/scheduling for the second cell may be transmitted on the first cell, e.g. to provide licensed-assisted controlling and scheduling.

An uplink carrier may generally be or indicate a carrier and/or frequency band intended and/or used for uplink transmissions.

A downlink carrier may generally be or indicate a carrier and/or frequency band intended and/or used for downlink transmissions.

A carrier may generally be an unlicensed carrier and/or be accessed for transmission based on and/or after a successful LBT procedure. A channel may generally be a physical channel and/or defined by comprising and/or being associated to one or more (radio and/or time/frequency) resources, in particular resource elements or resource blocks.

Interlacing may generally comprise transmitting on resources such that the transmitting device transmits on frequencies or frequency resources that are separated by one or more frequency units (e.g., smallest frequency unit, or in particular a frequency range covered by a resource block). The separating units may be frequency units on which the wireless transmitter does not transmit (with the exception of undesired leakage or interference, which may appear due to physical reasons). Generally, interlacing may in particular pertain to interlaces defined in regard to resource blocks (respectively, the corresponding frequency range covered by a RB). Interlacing may comprise transmitting one or more interlaces and/or on one or more interlaces.

Generally, interlacing may comprise mapping and/or scheduling one or more interlaces on resources, which may be scheduled resources. Scheduled resources may be scheduled and/or configured by the wireless transmitter, for example for downlink or uplink transmission. Scheduled resources may pertain to one or more resource units, in particular resource blocks and/or cover a plurality of frequency units, e.g. a carrier (which comprises a plurality of subcarriers). For uplink transmission, scheduled resources may be configured by another wireless transmitter, e.g. a network node. Mapping may generally be performed by a wireless transmitter itself, e.g. based on scheduled resources (e.g., a network node or terminal may perform the mapping itself, e.g. via a mapping module). Alternatively, the mapping may be performed by a configuring transmitter, e.g. a network node (in this case, the mapping may be indicated via allocation and/or configuration data, and/or interlacing may comprise transmitting according to scheduled resources and/or based on the indicated mapping).

An interlace may be defined regarding a frequency structure and/or associated resource structure such that an interlace comprises and/or covers a plurality of frequency units (and/or associated resource units), e.g., a number of Nu units, one of which is and/or may be used for transmission, wherein one or more others (e.g., Nu−1) are not used for transmission. The units in particular may be resource blocks. Nu may in on example be 6 or a multitude of 6.

The frequency units of an interlace may be continuous and/or contiguous in frequency. It may be considered that an interlace is generally defined pertaining to widths in frequency, rather than a specific frequency range (notwithstanding the possibility that different interlace may be defined for different frequency ranges, e.g. due to different protected intervals defined by regulations, and/or that a specific interlace would be defined and/or map the interlace structure to a specific frequency range). In particular, an interlace may cover a continuous or contiguous frequency range, which may be referred to as interlace range.

The frequency unit of an interlace used for transmission may be referred to as transmission unit, the other units may be referred to as non-transmission unit. A unit of an interlace may in particular be a resource block, respectively a frequency unit may correspond to the associated frequency range of a resource block. Generally, interlacing may comprise transmitting one or more interlaces (e.g., continuous and/or contiguous interlaces), which may thus include transmitting on a number of transmission units corresponding to the number of interlaces.

It may be considered that for interlacing, the transmission unit is at one of the borders of the frequency range covered by the interlace, e.g. at the highest or lowest frequencies of the interlace. The same arrangement of transmission unit in the interlace may be used for different interlaces (covering different frequency ranges) for performing interlacing. It may be considered that transmission units of interlaces are arranged such that each protected interval (e.g., of a system bandwidth) includes at most one transmission unit (transmission resource block).

An interlace or set of interlaces, respectively corresponding resources, may be considered to represent a cluster of resources, due to transmission units (a frequency or resource unit used or scheduled for transmission) and/or resources used or scheduled for transmission being clustered between transmission units and/or resources not used or scheduled for transmission. In this context, arranging a single transmission unit or resource, or more than one transmission unit or resource, between (regarding neighboring frequencies or frequency units like subcarriers) frequency or resource units not scheduled for transmission may be seen as clustering. Generally, clustering may pertain to, at least partly over a frequency range, in particular the range covered by one or more resource blocks, arranging transmission units (in particular, subcarriers) non-contiguous to other transmission units (at least on one side).

Scheduled resources and/or a resource allocation may indicate and/or comprise an interlace pattern. The resources or allocation may be transmission resources, in particular uplink transmission resources, and/or may be associated or allocated to a specific device, e.g. a wireless transmitter like a terminal (which may have been allocated the resources by a network node like an eNodeB, or a network node, which may have allocated the resources to itself). The pattern may comprise one or more sets of interlaces. One or more, in particular each, set/s, and/or the pattern, may be periodic and/or quasi-periodic, in particular in terms of location and/or arrangement of transmission units (in particular, subcarriers) or resources in frequency. It may be considered that the set/s and/or pattern is block-wise periodic or quasi-periodic. Block-wise (quasi-) periodicity may refer to a specific pattern of transmission units (in particular, subcarriers) being repeated (in frequency domain) over a frequency range for a plurality of times (twice or more, in particular 5 times or more). The (quasi-)periodicity may be considered block-wise, if the repeated pattern covers only a part of the interlace pattern of the scheduled resources or resource allocation.

An interlace pattern may comprise a plurality of repeating patterns, in particular of block-wise repeating patterns. The individual repeating patterns may be different. The repeating pattern/s may be associated and/or be dependent on interlaces and/or sets of interlaces the interlace pattern comprises. The interlace pattern may generally be defined and/or configured based on interlace indications or interlace set indications (which may be represented by configuration data or allocation data). A repeated pattern may be considered quasi-periodic if one or more transmission units (in particular, subcarriers) are slightly shifted away from periodicity in the frequency domain. A slight shift may be a shift of one or two width of a transmission unit widths (in particular, subcarrier widths) up or down, and/or a shift for a distance (in frequency domain) lower than 10% or lower than 5% of the total frequency range covered by the repeated pattern. A periodic or quasi-periodic repeated pattern may have transmission units or clusters of neighboring or contiguously arranged transmission units (in particular, subcarriers or blocks or clusters of subcarriers) equidistantly arranged (in regard to frequency domain). The distance in frequency domain may for example be in frequency or frequency units, in particular in subcarriers (and/or smallest frequency units).

Interlacing may generally comprise performing a DFT-OFDM modulation for signals to be transmitted, in particular based on scheduled resources or a resource allocation, which may comprise or indicate an interlace pattern. Performing modulation may comprise and/or be based on a RB-to-subcarrier mapping, e.g. of QAM-modulated signals. DFT-OFDM modulated signals on scheduled resources or a resource allocation. The modulation may be a clustered modulation and/or a DFT-S-OFDM (DFT-spread-OFDM) modulation. The modulation may be performed as described herein. A wireless transmitter may be adapted for performing such modulation and/or comprise a modulation module for such modulation. A DFT-OFDM modulation may be considered clustered, as and/or when it is performed on clustered resources, e.g. an interlace pattern as described herein.

An interlace pattern may generally comprise and/or indicate one or more sets of interlaces. The pattern may indicate or comprise frequency units (e.g., subcarriers) and/or resources available and/or scheduled for transmission, e.g. resource blocks and/or one or more transmission units, e.g. subcarriers. The pattern may be indicated by configuration data and/or allocation data.

A wireless transmitter, in particular a network node, may configure, and/or be adapted for configuring and/or comprise a configuring module for configuring, one or more wireless transmitters, e.g. terminals, for performing interlacing, and/or for utilizing a set of interlaces for transmitting, e.g. by allocating or configuring the resources corresponding to a set of interlaces to a terminal, for example by transmitting corresponding configuration or allocation data.

Performing interlacing and/or transmitting based on a frequency structure and/or resource structure may refer to following and/or utilizing the structure when transmitting.

Interlacing, and/or transmitting in particular in the context of interlacing, may comprise performing an LBT procedure, and/or may be dependent on a successful LBT procedure, e.g. for the transmission unit and/or the interlace including the transmission unit. Interlacing, and/or transmitting in particular in the context of interlacing, may comprise transmitting such that in the/each transmitting unit/transmitting resource block of an interlace the maximum allowable power or PSD and/or a power up to the maximum allowable power or PSD for a protected interval is used for transmission. It may be considered that interlacing or transmitting comprises transmitting such that in average over a predetermined number of time units (e.g., slots and/or sub-frames and/or time units associated to a resource structure or resource unit) in the transmitting unit/transmitting resource block of an interlace the maximum allowable power or PSD and/or a power up to the maximum allowable power or PSD for a protected interval is used for transmission. This maximum power/PSD may be defined as requirement or condition for the protected interval in which the transmitting unit is arranged and/or covered by the interlace.

A Sounding Reference Signal may generally be a reference signal, which may be provided, e.g., to estimate channel status and/or channel quality and/or timing/synchronization. A receiver of such a reference signal may generally know the power of transmission and/or an expected timing of the reference signal, and be adapted to compare this power of transmission with the received power for such estimation.

It may be considered that the reference signal, in particular a SRS, is an uplink signal, which may be intended for a network node like an eNodeB, and/or a sidelink signal, which may be intended for another terminal. The network and/or network node may be adapted to configure a terminal transmitting reference signals/SRS with the power of transmission and/or the power of transmission may be defined by a standard. There may be different kinds of reference signals/SRS, e.g. cell-specific signals or terminal/UE-specific signals. A terminal may be configurable for reference signal/SRS transmission, and/or a network node like an eNodeB may be adapted for such configuring and/or perform such configuring. Configuring for reference signal transmission may comprise configuring timing, e.g. where in a time-structure like a subframe or slot the SRS is to be transmitted, and/or frequency of transmission (how often/in which time-intervals transmission is to be performed) and/or resource/s used for transmission, which resource element/s.

A resource element may be considered to be a form of time/frequency resource, in particular the smallest unit defined for such resource. A resource element may in particular comprise one subcarrier (in frequency domain) and one symbol (in time domain).

Some useful abbreviations include:

Abbreviation Explanation

SRS Sounding reference signal
DMRS Demodulation reference signals
eNB Evolved NodeB, base station
UE User Equipment
UL Uplink
LAA Licensed-Assisted Access
RS Reference Signal
SCell Secondary Cell
LBT Listen-before-talk
LTE-U LTE in Unlicensed Spectrum
PUSCH Physical Uplink Shared Channel
PUCCH Physical Uplink Control Channel
CA Carrier Aggregation
CoMP Coordinated Multiple Point Transmission and Reception
CQI Channel Quality Indicator
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a D2D enabled node or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
FDD Frequency Division Duplexing
ID Identity
L1 Layer 1
L2 Layer 2
LTE Long Term Evolution, a telecommunications standard
MAC Medium Access Control
MBSFN Multiple Broadcast Single Frequency Network
MDT Minimization of Drive Test
NW Network
OFDM Orthogonal Frequency Division Multiplexing
O&M Operational and Maintenance
OSS Operational Support Systems
PC Power Control
PDCCH Physical DL Control CHannel
PH Power Headroom
PHR Power Headroom Report
PSS Primary Synchronization Signal
PUSCH Physical Uplink Shared CHannel
R1, R2, . . . , Rn Resources, in particular time-frequency resources, in particular assigned to corresponding carrier f1, f2, . . . , fn
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SL Sidelink, pertains to D2D transmission (Device-to-Device), between terminals, which may be supported by or independent of the network; a SL may use UL carrier/bandwidth (in particular FDD)
SINR/SNR Signal-to-Interference-and-Noise Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These abbreviations may be interpreted according to the LTE or a related standard.

What is claimed is:

1. A User Equipment for a MulteFire wireless communication network, the User Equipment comprising processing circuitry and a transmitter, the processing circuitry being configured to use the transmitter to:

perform a Listen-Before-Talk (LBT) procedure for one or more transmission bandwidths;

transmit Physical Uplink Shared CHannel (PUSCH) signaling in a PUSCH subframe on one or more interlaces within the one or more transmission bandwidths; and transmit Sounding Reference Signaling on the one or more interlaces in the PUSCH subframe, wherein transmitting Sounding Reference Signaling comprises multiplexing Sounding Reference Signaling transmitted on different antenna ports via frequency division.

2. The User Equipment of claim 1, wherein the processing circuit is configured to use the transmitter to transmit the Sounding Reference Signaling at the end of the PUSCH subframe, including in the last symbol of the PUSCH subframe.

3. A method for operating a User Equipment in a MulteFire wireless communication network, the method comprising:

performing a Listen-Before-Talk (LBT) procedure for one or more transmission bandwidths;

transmitting Physical Uplink Shared CHannel (PUSCH) signaling in a PUSCH subframe on one or more interlaces within the one or more transmission bandwidths; and transmitting Sounding Reference Signaling on the one or more interlaces in the PUSCH subframe, wherein transmitting Sounding Reference Signaling comprises multiplexing Sounding Reference Signaling transmitted on different antenna ports via frequency division.

4. The method of claim 3, wherein transmitting Sounding Reference Signaling comprises transmitting Sounding Reference Signaling at the end of the PUSCH subframe, in particular in the last symbol of the PUSCH subframe.

5. An Access Point for a MulteFire wireless communication network, the Access Point comprising processing circuitry and a receiver, the processing circuitry being configured to use the receiver to:

estimate channel conditions based on Sounding Reference Signaling received from at least one User Equipment for the MulteFire wireless communication network;

wherein the received Sounding Reference Signaling comprises Sounding Reference Signaling received on one or more interlaces in a Physical Uplink Shared CHannel (PUSCH) subframe, wherein Sounding Reference Signaling transmitted by a terminal on different antenna ports is multiplexed via frequency division.

6. The Access Point of claim 5, wherein Sounding Reference Signaling is received at the end of the PUSCH subframe, including in the last symbol of the PUSCH subframe.

7. The Access Point of claim 5, wherein Sounding Reference Signaling transmitted by terminals on different antenna ports and/or by different terminals is multiplexed based on cyclic shifts.

8. The Access Point of claim 7, wherein Sounding Reference Signaling is received at the end of the PUSCH subframe, including in the last symbol of the PUSCH subframe.

9. A method for operating an Access Point in a MulteFire wireless communication network, the method comprising:

estimating channel conditions based on Sounding Reference Signaling received from at least one User Equipment for the MulteFire wireless communication network;

wherein the received Sounding Reference Signaling comprises Sounding Reference Signaling received on one or more interlaces in a Physical Uplink Shared CHannel (PUSCH) subframe, wherein Sounding Reference Signaling t transmitted by a terminal on different antenna ports is multiplexed via frequency division.

10. The method of claim 9, wherein Sounding Reference Signaling is received at the end of the PUSCH subframe, including in the last symbol of the PUSCH subframe.

11. The method of claim 9, wherein Sounding Reference Signaling transmitted by terminals on different antenna ports and/or by different terminals is multiplexed based on cyclic shifts.

12. The method of claim 11, wherein Sounding Reference Signaling is received at the end of the PUSCH subframe, including in the last symbol of the PUSCH subframe.

* * * * *